UNITED STATES PATENT OFFICE.

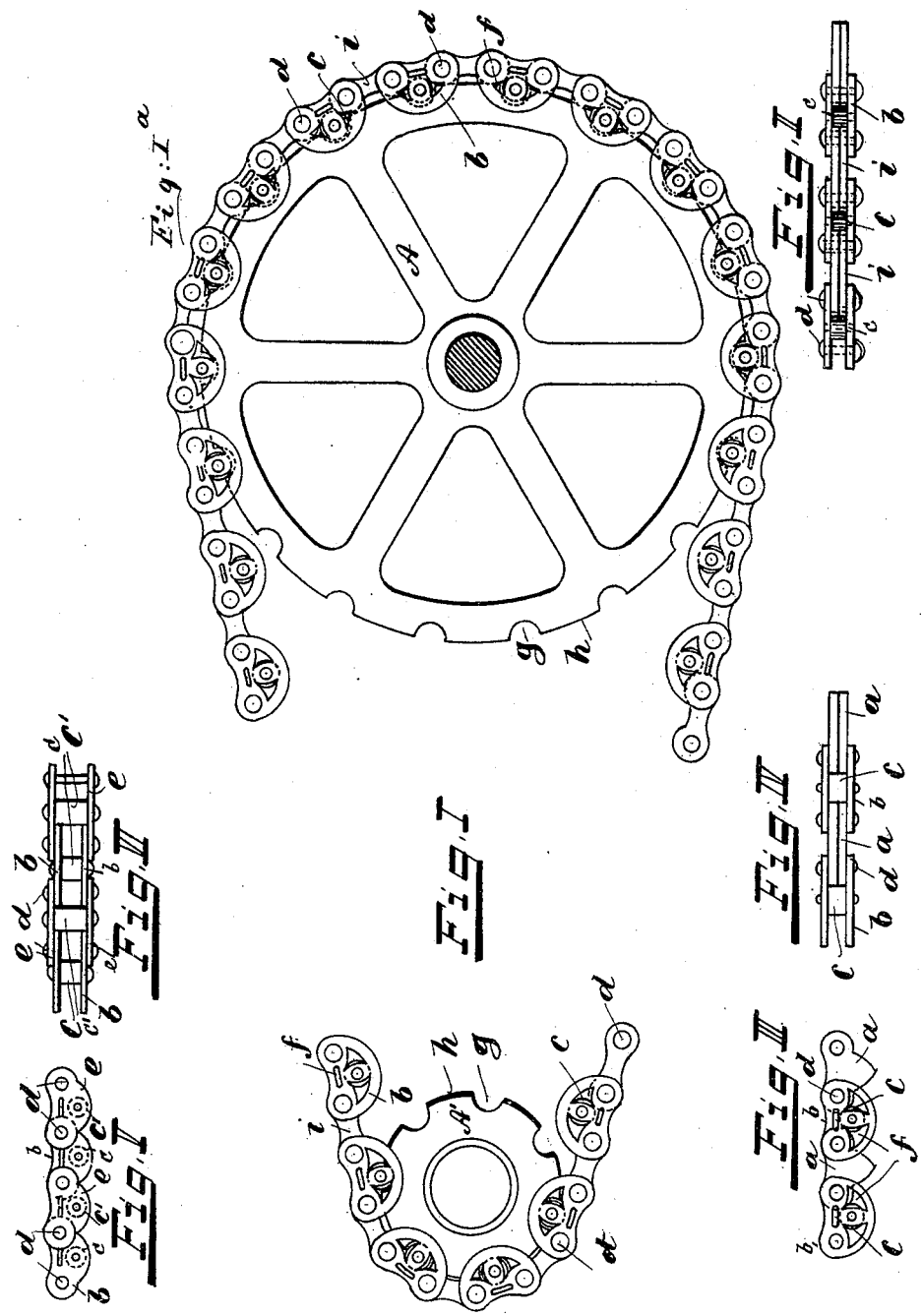

JOSEPH HAIDER, OF MUNICH, GERMANY.

CHAIN-GEARING.

SPECIFICATION forming part of Letters Patent No. 616,919, dated January 3, 1899.

Application filed February 8, 1898. Serial No. 669,521. (No model.)

*To all whom it may concern:*

Be it known that I, JOSEPH HAIDER, a citizen of Germany, residing at Munich, Bavaria, Germany, have invented an Improved Chain-Gearing, of which the following is a specification.

This invention relates to a chain-gearing for bicycles, &c., in which the transmission is effected by rollers that engage corresponding notches of the wheel. The chain and wheel are so constructed that the pivots of the chain-links are placed beyond the periphery of the wheel. As the length of the radius from the center of the chain-pivots determines the ratio of transmission, I obtain for an equal ratio of transmission a smaller radius for the chain-wheel, as heretofore. The rolls of the chain, as well as the corresponding notches of the wheel, are so formed that the rolls effect a noiseless engagement with a minimum amount of friction, so that an easy running with little consumption of power is effected. As the chain-pivots are placed entirely beyond the periphery of the wheel and do not themselves effect the transmission, they will last much longer than the pivots of the chains heretofore in use. Practical trials have demonstrated that the chain will not become dislodged from its seat on the wheel or when the chain has become stretched by excessive wear. Finally, it may be stated that the weight of the chain is light and that the chain and wheel may be manufactured at small cost.

In the accompanying drawings, Figure I is a side elevation of my improved chain-gearing, showing a small chain-wheel; Fig. I$^a$, a similar elevation showing a large wheel; Fig. II, a plan of the chain; Fig. III, a side view of a modification of the chain; Fig. IV, a plan thereof; Fig. V, a side view of a further modification of the chain, and Fig. VI a plan thereof.

With particular reference to Figs. I, I$^a$, and II, the chain is composed of two sets of links $b$ and $i$, arranged in pairs and alternating with one another. The outer links $b$ are made to form shields, they being provided with inwardly-projecting cheeks or extensions that overlap the edge of the chain-wheel A.

Between each pair of outer links $b$ is placed a pair of inner links $i$, connected thereto by pivots $d$, arranged in a line. To the cheeks of every link pair $b\ b$ is journaled an anti-friction-roller $c$, which engages a corresponding notch $g$ of the chain-wheel, the rollers $c$ being arranged in a second line parallel to line of pivots $d$. The cheeks $b$ extend below the circumference of the rollers $c$, so as to form a pair of jaws that are adapted to embrace the wheel-rim to the right and left of each notch $g$. Perforations or openings $f$ in links $b$ permit the mud accumulating in the chain or in the notches $g$ to be crowded outward by the engagement between chain and wheel, so that the chain will remain clean and a correct engagement will always be effected.

The chain-wheels A A$'$ are flangeless and should be of such a size that the eyes of pivots $d$ will lie upon the arcs $h$ of their rim, while the notches $g$ should be so formed that the rolls $c$ will fit them closely, the bases of the notches $g$ forming bearing-surfaces for the rollers $c$, which are concentric to the bearing-surfaces or arcs $h$ of the pivots $d$. As with a wheel of smaller diameter the rolls $c$ will approach each other more closely than with a wheel of larger diameter, the notches $g$ are placed nearer together on the small wheel A$'$ than on the large wheel A. This appears from Figs. I and I$^a$, the solid rim-sections $h$ in the former figure being considerably shorter than the corresponding sections in the latter figure.

The cheeks formed on the links $b$, that straddle the rim of the chain-wheel, will securely hold the chain upon the wheel by preventing lateral displacement.

In Figs. III and IV the links $i$ are replaced by links $a$, having inwardly-projecting pointed noses, the curved sides of which are struck from the centers of pivots $d$. The chain-wheel is provided between notches $g$ with additional notches which are adapted to receive these noses and which have curved side walls corresponding to the shape of the noses.

In Figs. V and VI the links $i$ are replaced by links $e$, that are arranged outside of links $b$, and are of substantially the same form as the latter. Rolls $c'$, carried by the links $e$, engage additional or intermediate notches of the chain-wheel.

What I claim is—

A chain-wheel having two concentric rows of bearing-surfaces, combined with a chain having curved links, a row of link-pivots and a concentric row of antifriction-rollers, the cheeks of the curved links extending downwardly at each side of the wheel-rim, beyond the circumference of the antifriction-rollers, substantially as specified.

JOSEPH HAIDER.

Witnesses:
 EMIL HENZEL,
 CRESZENZ OSTERMAIR.